(12) United States Patent
Seiler et al.

(10) Patent No.: US 10,437,216 B2
(45) Date of Patent: Oct. 8, 2019

(54) METHOD FOR ENERGY MANAGEMENT OF A FIELD DEVICE OF PROCESS AUTOMATION

(71) Applicant: Endress+Hauser SE+Co. KG, Maulburg (DE)

(72) Inventors: Christian Seiler, Neuenburg (DE); Peter Klöfer, Steinen (DE)

(73) Assignee: ENDRESS+HAUSER SE+CO. KG., Maulburg (DE)

( * ) Notice: Subject to any disclaimer, the term of this patent is extended or adjusted under 35 U.S.C. 154(b) by 0 days.

(21) Appl. No.: 15/758,383

(22) PCT Filed: Aug. 12, 2016

(86) PCT No.: PCT/EP2016/069200
§ 371 (c)(1),
(2) Date: Mar. 8, 2018

(87) PCT Pub. No.: WO2017/041989
PCT Pub. Date: Mar. 16, 2017

(65) Prior Publication Data
US 2018/0253072 A1    Sep. 6, 2018

(30) Foreign Application Priority Data
Sep. 10, 2015   (DE) .................. 10 2015 115 275

(51) Int. Cl.
*G05B 19/042*     (2006.01)
*G05B 19/418*     (2006.01)
*H04L 12/40*      (2006.01)

(52) U.S. Cl.
CPC ....... *G05B 19/042* (2013.01); *G05B 19/4185* (2013.01); *H04L 12/40045* (2013.01);
(Continued)

(58) Field of Classification Search
CPC ............. G05B 19/042; G05B 19/4185; G05B 2219/25289; G05B 2219/25357; G05B 2219/25428; H04L 12/40045
See application file for complete search history.

(56) References Cited

U.S. PATENT DOCUMENTS

2006/0290328 A1*  12/2006  Orth ................. G01D 21/00
                                                 323/218
2010/0222895 A1*  9/2010   Seiler ............... G05B 19/4185
                                                 700/16
2011/0093129 A1*  4/2011   Nilsson ............. G01F 23/284
                                                 700/295

FOREIGN PATENT DOCUMENTS

DE    102005039438 A1    2/2007
DE    102006062603 A1    7/2008
(Continued)

OTHER PUBLICATIONS

Search Report for German Patent Application No. 10 2015 115 275.4, German Patent Office, dated May 31, 2016, 7 pp.
(Continued)

*Primary Examiner* — Yuhui R Pan
(74) *Attorney, Agent, or Firm* — Mark A. Logan; PatServe

(57) ABSTRACT

The invention relates to a method for energy management of a process automation field device having a first module and at least a second module, wherein the field device is supplied with energy by a two conductor bus, wherein the first module, at least temporarily, consumes more energy than the two conductor bus continuously delivers, and an energy storer supplied by the two conductor bus is associated with the first module, wherein the second module is supplied continuously with energy by the two conductor bus, wherein operation of the first and second modules is so controlled that the second module has precedence over the first module
(Continued)

and the first module is, in given cases, at least temporarily, not functional.

6 Claims, 3 Drawing Sheets

(52) U.S. Cl.
CPC .............. *G05B 2219/25289* (2013.01); *G05B 2219/25357* (2013.01); *G05B 2219/25428* (2013.01)

(56) References Cited

FOREIGN PATENT DOCUMENTS

| DE | 102007048476 A1 | 4/2009 |
|---|---|---|
| DE | 102007054924 A1 | 5/2009 |
| DE | 102010042717 A1 | 4/2012 |

OTHER PUBLICATIONS

Search Report for International Patent Application No. PCT/EP2016/069200, WIPO, dated Dec. 2, 2016, 11 pp.

\* cited by examiner

METHOD FOR ENERGY MANAGEMENT OF A FIELD DEVICE OF PROCESS AUTOMATION

CROSS-REFERENCE TO RELATED APPLICATIONS

The present application is related to and claims the priority benefit of German Patent Application No. 10 2015 115 275.4, filed on Sep. 10, 2015 and International Patent Application No. PCT/EP2016/069200, filed on Aug. 12, 2016 the entire contents of which are incorporated herein by reference.

TECHNICAL FIELD

The invention relates to a method for energy management of a field device of process automation having a first module and at least a second module.

BACKGROUND

In process automation technology, field devices are often applied, which serve for registering and/or influencing process variables. Referred to as field devices are, in principle, all devices, which are applied near to the process and which deliver, or process, process relevant information. Besides sensors and actuators, referred to as field devices are generally also such units, which are connected directly to a fieldbus, and which serve for communication with a control unit such as a control system, i.e. such units as e.g. remote I/Os, gateway, linking devices and wireless adapters.

A large number of such field devices are produced and sold by the Endress+Hauser group of companies.

Frequently, field devices are connected by means of two wire technology to a control station. In the case of two wire technology, also called two conductor technology, electrical current for energy supply and for communication signals is sent over the same line: one wire for the outgoing direction, and one wire for the return path. In other words, energy supply and signal utilize the same line; there is no separate energy supply. This electrical current, or the corresponding power, must be managed by a field device and divided among the individual components of the field device. Thus, for instance, the sensor element, the communication and the control unit must manage together within the existing power budget.

The rejection of wired data transmission for connecting a field device has in the field of industry the potential to reduce costs of wiring, improve usability and therewith generate benefits for the user.

For energy supply, function modules such as, for instance, a sensor element M or a communication module, are connected after a direct voltage converter DC, which converts the input voltage from the two conductor bus 4 into a voltage suitable for the particular function module. See, in this connection, an example of an electronic circuit 2 from the state of the art in FIG. 1. For the measuring function in the case of certain measuring devices, such as, for instance, measuring the fill level using the radar principle, more power is consumed than the 4 . . . 20 mA supply can make available. Therefore, an energy storing capacitor C is necessary for storing energy for supplying the sensor element. One speaks also of buffering or of the buffer capacitor C. The storage capacitor C is charged between measuring phases directly from the two conductor bus 4. The measuring is only executed after the charge status of the storage capacitor C has reached a certain level. The charge status is measured, for instance, via the voltage V across the storage capacitor C. U.S. Pat. No. 7,262,693, for example, discloses the application of a capacitor, in order to store energy from the bus intermediately, in order then to provide it to a wireless module.

Likewise, a communication module could be present, which, in equal manner, such as above described, requires more power for operation, thus for sending/receiving, than is permanently and continuously available. This is, for example, the case for WLAN, for instance, according to a standard of the IEEE-802.11 family.

Other wireless communication modules, such as, for instance, Bluetooth with the protocol stack, Low Energy, as well as certain measuring functions could, in the present state of the art, manage completely with the power provided by the bus, even without any buffering. The two functions, measuring and communication, can, however, most often, not be operated simultaneously, since the power balance of the total device must be maintained. In many cases in the present state of the art, consequently, a buffering of the energy is applied for all function modules.

SUMMARY

An object of the invention is to assure the functioning of all function modules of a field device and to manage the energy provided by a two conductor bus without having to buffer all function modules.

The object is achieved by a method for energy management of a field device having a first module and at least a second module, wherein the field device is supplied with energy by a two conductor bus, wherein the first module, at least temporarily, consumes more energy than the two conductor bus continuously delivers, and an energy storer supplied by the two conductor bus is associated with the first module. The first module is, thus, supplied by an energy storer. Principally in this way, the first module is made functional. The second module, in contrast, is supplied continuously with energy by the two conductor bus, wherein operation of the first and second modules is so controlled that the second module has precedence over the first module and the first module is, in given cases, at least temporarily, not functional. The second module is, in such case, always fully functional.

A function module in the field device can, thus, in a certain phase, claim the entire energy. Typically, the function module, which has its own energy storer, adapts its operation. It is permitted to use only that power, which exactly can be supplementally made available by the two conductor bus without disturbing the operation of the function module lacking an energy storer.

In an advantageous, further development, the second module has no energy storer and is continuously and exclusively supplied with energy by the two conductor bus. Thus, this module can always and durably be fully functional.

In a preferred embodiment, the second module informs the first module of its operation and the first module then adapts its operation such that the entire required energy of the field device can be provided by the two conductor bus. The first module, thus, synchronizes with the second module such that the second module (without energy storer) is always supplied with sufficient energy by the two conductor bus. This can, for instance, be driven by software, in case the two modules are controlled, for instance, by an intelligent unit, for instance, a microcontroller. Alternatively, the modules are arranged in different circuits and a communication occurs through corresponding communication lines or signaling lines.

In an alternative advantageous embodiment, the energy storer is isolated from the two conductor bus during operation of the second module. In such case, the terminology, "during operation", means that, in such case, the main function of the particular module is executed. If the second module is, for instance, embodied as a wireless module for sending and receiving values (see below), the main function is the sending and receiving. During the transmitting, or receiving, the energy storer is thus isolated. If the second module is embodied as a sensor module, the energy storer is isolated during the measuring.

Advantageously, the second module isolates the energy storer from the two conductor bus. Then the isolation occurs always at the right point in time. This can, for instance, be software driven or occur via a corresponding circuit. Alternatively or controlled thereby, the isolation occurs by means of an intelligent unit, for instance, by means of a microprocessor.

In a preferred embodiment, the first module includes a sensor element for registering a measured variable, wherein the sensor element forwards values to a wireless module, and wherein the second module includes the wireless module for wirelessly transmitting the values to a superordinated unit. The sensor element is, in such case, supplied by the first energy storer.

The terminology, "values", in the sense of this invention, means in a first advantageous embodiment "values dependent on the measured variable". I.e., the sensor element forwards to the wireless module values dependent on the measured variable, and the wireless module transmits the values dependent on the measured variable wirelessly to a superordinated unit.

In a second advantageous embodiment, the terminology, "values", means parameters, wherein a "parameter", in such case, is an actuating- or influencing variable, which acts on the sensor element and, thus, changes the behavior of the sensor element or delivers information concerning the state of the sensor element. I.e., the sensor element forwards parameters to the wireless module, wherein the wireless module wirelessly transmits these parameters to a superordinated unit. In an additional advantageous, further development, parameters are transmitted in the reverse direction, i.e. a superordinated unit transmits parameters wirelessly to the wireless module, which forwards the parameters to the sensor element.

In an advantageous embodiment, the first module includes, thus, a sensor element, for instance, for registering fill level, for example, according to the radar principle. In an additional embodiment, the first module includes a sensor element (e.g. an ISFET) for determining an analytical parameter, especially for measuring pH, redox-potential, conductivity, turbidity or oxygen. Other advantageous embodiments comprise sensor elements for registering flow according to one of the principles, Coriolis, magneto-inductive, vortex and ultrasound. Other advantageous embodiments comprise sensor elements for registering fill level according to one of the principles, guided radar and freely radiating radar (such as already mentioned), as well as ultrasound, also for detecting a limit level, wherein for detecting limit level also capacitive methods can be used. In an additional embodiment, the first module comprises a wireless module with increased energy consumption, thus, for instance, a WLAN module, especially according to the standard IEEE-802.11.

In a preferred further development, also in the case of maximum transmission power of the wireless module, the entire required energy of the field device can be provided by the two conductor bus. Thus, it is always assured that the wireless module is fully functional.

BRIEF DESCRIPTION OF THE DRAWINGS

The invention will now be explained in greater detail based on the appended drawing, the figures of which show as follows.

Figure 1:
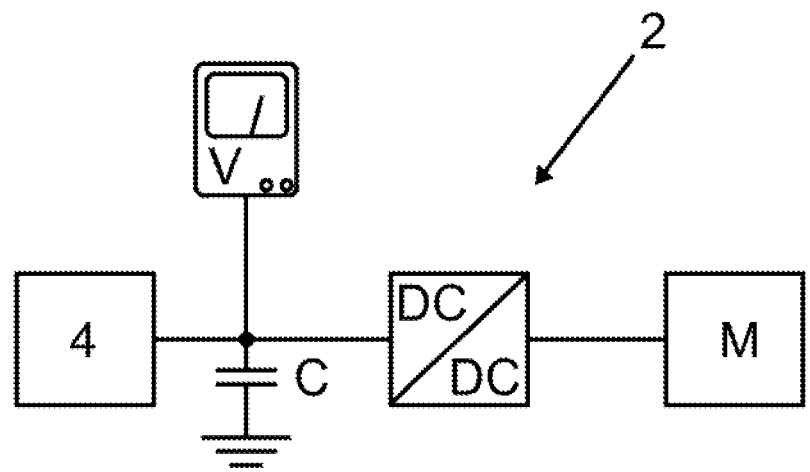
FIG. 1 shows an electronic circuit of the state of the art.

In the figures, equal features are provided with equal reference characters.

DETAILED DESCRIPTION

Figure 2:
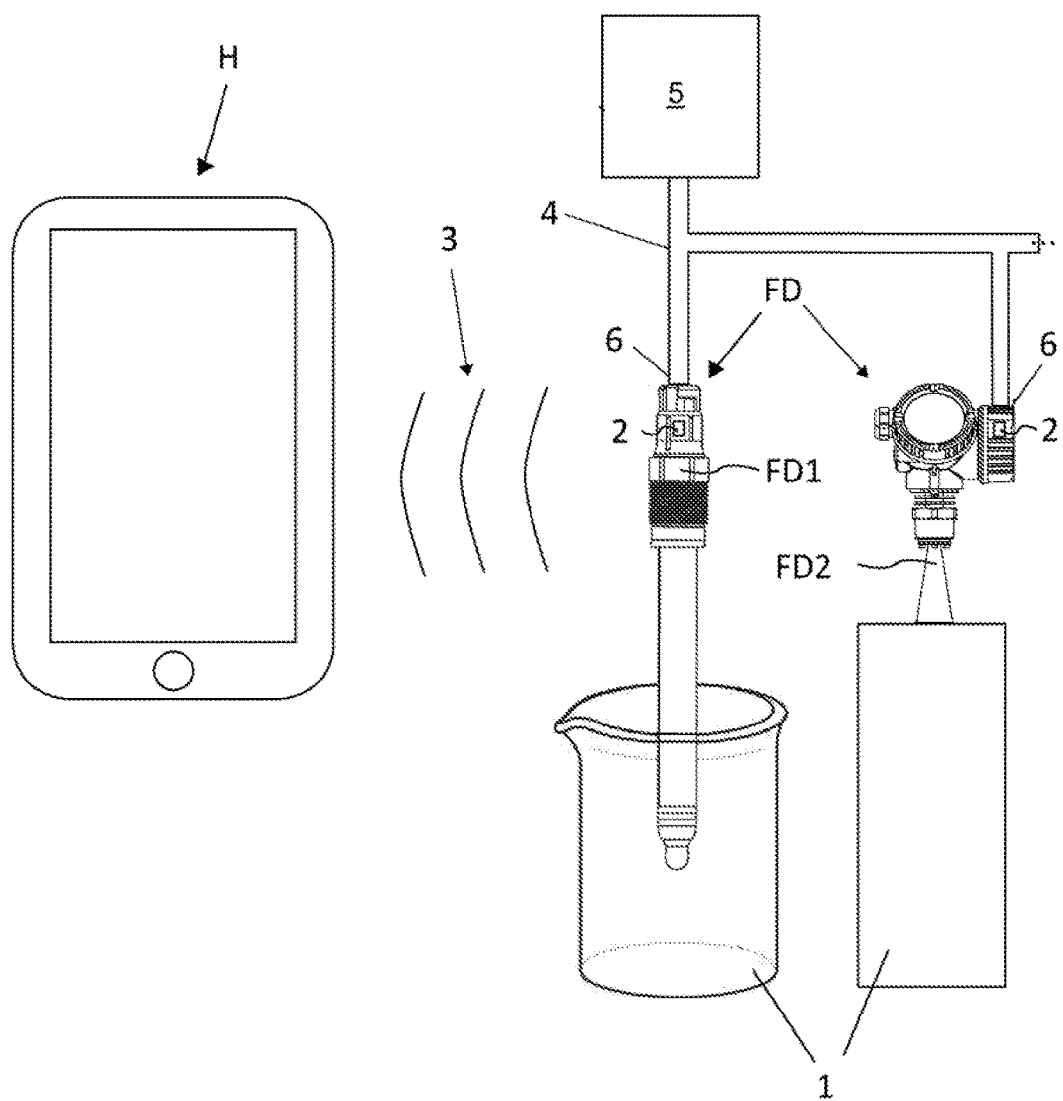
FIG. 2 shows a field device applied in the method of the invention.

FIG. 1 has already been explained in the introduction.
FIG. 2 shows a field device FD of process automation technology, for example, a sensor. More exactly, two field devices FD1 and FD2 are pictured. The sensor is, for instance, a pH-, redox-potential-, also ISFET-, conductivity-, turbidity- or oxygen sensor. Other possible sensors are flow sensors according to the principles, Coriolis, magneto-inductive, vortex and ultrasound. Other possible sensors are sensors for measuring fill level according to the principles, guided and freely radiating radar as well as ultrasound, also for detecting a limit level, wherein for detecting limit level also capacitive methods can be used. The sensor includes a sensor element M as a first function module of the field device FD. Also, the sensor element M can be part of the electronic circuit 2, see below.

Shown on the left is a pH sensor and on the right a fill-level sensor working according to the radar principle. The field device FD determines a measured variable of a medium 1, in the example present in a beaker, such as shown on the left side. Equally possible are other containments, such as conduits, vats (such as shown on the right side), containers, kettles, pipes, pipelines and the like.

The field device FD communicates with a control unit, for instance, directly with a control system 5 or with an interposed transmitter. Also, the transmitter can be part of the field device, such as, for instance, in the case of the fill level sensor. The communication to the control system 5 occurs via a two conductor bus 4 operating, for instance, via a HART, PROFIBUS PA or FOUNDATION Fieldbus protocol. It is also possible to embody the interface 6 to the bus supplementally or alternatively as a wireless interface, for instance, according to the wireless HART standard (not shown), wherein via wireless HART a connection directly to a control system occurs via a gateway. Moreover, optionally or supplementally, in the case of the HART protocol, a 4 . . . 20 mA interface is provided (not shown). If the communication occurs supplementally or alternatively to a transmitter instead of directly to the control system 5, either the above mentioned bus systems (HART, PROFIBUS PA or FOUNDATION Fieldbus) can be used for communication, or, for example, a proprietary protocol, for instance, of the "Memosens" type is used. Corresponding field devices, such as above described, are sold by the applicant.

As mentioned, an interface 6 is provided on the bus side of the field device FD for connection to the two conductor bus 4. Shown is a wired variant for connecting to the bus by means of the interface 6. Interface 6 is embodied, for example, as a galvanically isolating interface, especially as an inductive interface. This is shown in the case of the pH sensor. Interface 6 is composed of two parts, with a first part being located on the field device side and a second part being located on the bus side. These can be coupled with one another by means of a mechanically plugged connection. Sent via the interface 6 are data (bidirectionally) and energy (unidirectionally, i.e. in the direction from the control unit 5 to the field device FD). Alternatively, an appropriate cable is used with or without galvanic isolation. Possible embodiments comprise a cable with an M12- or ⅞" plug. This is shown, for example, in the case of the fill-level measuring device operating according to the radar principle.

Field device FD further includes an electronic circuit 2 comprising a wireless module BT for wireless communication 3. The wireless module BT is a second function module of the field device FD. The wireless communication 3 does not serve for connecting to the two conductor bus 4.

Wireless module BT is embodied, for instance, as a Bluetooth module. The Bluetooth module conforms especially to the protocol stack, Low Energy, e.g. "Bluetooth Low Energy" (also known as BTLE, BLE, or Bluetooth Smart). In given cases, the wireless module BT includes a corresponding circuit, or components. The field device FD conforms, thus, at least to the standard, "Bluetooth 4.0". The communication 3 occurs from the field device FD to a superordinated unit H. The superordinated unit H is, for example, a mobile unit, such as a mobile telephone, a tablet, a notebook, or the like. Alternatively, the superordinated unit H can also be embodied as a nonportable device, such as, for instance, a computer. Alternatively, the superordinated unit is a display with corresponding interface.

Figure 3:
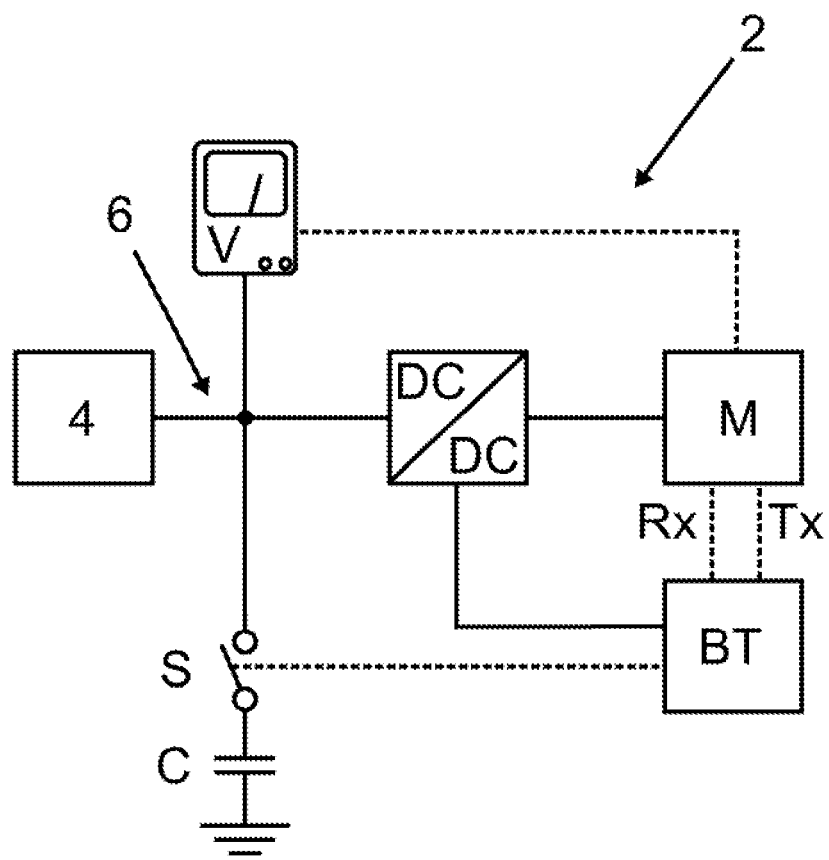
FIG. 3 shows an electronic circuit for explaining the method.

FIG. 3 shows the electronic circuit 2 more exactly.

Circuit 2 includes as first module the sensor element M and as a second module the wireless module BT. Each of the modules is supplied with energy by the bus 4. Interposed in front of the two modules is a direct voltage converter DC (a DC-DC converter), wherein an energy storer C (see below) is placed in front of the direct voltage converter. The direct voltage converter DC converts the input voltage, for instance, 10-45 V, to, for instance, 3-5 V. In an alternative embodiment (not shown), the energy storer C is connected after the direct voltage converter DC.

Sensor element M serves for registering the measured variable. The two conductor bus 4 does not deliver enough energy, such that the sensor element M could be supplied with energy continuously by the two conductor bus 4, because of which an energy storer C is associated with the sensor element M. The energy storer C, thus, supplies the sensor element M with energy.

The energy storer C is, for instance, a capacitor for storing energy. In the sense of this invention, an energy storer is not a filter capacitor, a smoothing capacitor, a capacitor for assuring electromagnetic compatibility or a capacitor such as, for instance, required in direct voltage converters. The energy storer C is directly chargeable by the two conductor bus 4.

As mentioned, the sensor element M is supplied with energy via the energy storer C, since the energy requirement is greater than the two conductor bus 4 could continuously deliver. Generally, the sensor element M is a module, which temporarily requires a large power, or energy. This energy cannot be continuously delivered by the two conductor bus. Alternatively to the sensor element M, a wireless module with an increased energy requirement can be selected, for instance, a WLAN module. If, instead of the sensor element with high energy requirement, a WLAN module is used, instead of the wireless module BT (see below), a sensor element can be used, which can be supplied continuously by the bus 4, for instance, a temperature sensor or a pressure sensor (see likewise below).

Circuit 2 further includes a wireless module BT for wireless transmission to the superordinated unit H of the values dependent on the measured variable. The wireless module is also supplied by the direct voltage converter DC, which converts the voltage, for instance, from 10-45 V to 3-5 V. It can, in such case, be the same direct voltage converter DC, which also delivers the energy for the sensor element M (shown), or it can be a separate direct voltage converter (not shown) or a linear converter (likewise not shown).

The wireless module BT is supplied with energy exclusively by the two conductor bus 4. Wireless module BT never needs more power than the two conductor bus 4 can continuously deliver. For this reason, also no additional capacitor, in general, no further energy storer, is necessary in this branch. Wireless module BT includes as a second function module, thus, no energy storer and is continuously and exclusively supplied by the two conductor bus 4.

Alternatively to the wireless module, also a sensor element, for instance, a temperature sensor or pressure sensor, can be used, which can be supplied continuously with energy by the bus 4.

Since the sensor element M consumes more energy than the bus 4 can continuously deliver, a measurement only takes place when the energy storer C is sufficiently charged and a complete measuring cycle can occur. In this regard, the circuit 2 also includes a corresponding measurement circuit V, in order to monitor the charge status of the energy storer C. After measurement of the corresponding measured variable, the sensor element M forwards values dependent on the measured variable to the wireless module BT. In this regard, communication lines Tx and Rx are used. This communication is shown dashed in FIG. 2.

Besides the values dependent on the measured variable, also parameters are transmitted, wherein the terminology, "parameter", means an actuating- or influencing variable, which acts on the sensor element and, thus, changes the behavior of the sensor element or delivers information concerning the state of the sensor element. For the sake of completeness, it should be mentioned that parameters can also be transmitted in the reverse direction, i.e. a superordinated unit transmits parameters wirelessly to the wireless module, which forwards the parameters to the sensor element.

According to the invention, it is provided that the operation of the function modules is so controlled that the module, which can be continuously supplied by the bus 4, has precedence over the module, which requires an energy storer. Ultimately, this leads to the fact that the module with the at least temporarily, high energy consumption can at times be not fully or even not at all functional. The module without energy storer is, in such case, always fully functional.

In a concrete example, the wireless module BT can thus always be sending, or receiving, while the sensor element M either stops its measurement operation or so changes the measuring function that the wireless module BT can always be sufficiently supplied with energy directly from the bus. For example, for this the number of measurements per unit time can be reduced, the accuracy of measurement changed or the sampling rate, etc. lessened. The wireless module BT is also in the case of maximum transmitting- or receiving power, thus in the case of maximum energy requirement of the wireless module, supplied with sufficient energy. Only when energy is in excess is the energy storer C charged and measurement made when the storer C is full. The measuring and the communication of the charge state is shown dashed.

The sensor element M does not draw energy, which the wireless module BT needs for its operation. The capacitance of the energy storer C is so embodied that enough energy is available for a complete measuring cycle. Therefore, a measuring can always be completed, a current measured value delivered and forwarded appropriately to the wireless module BT. When the wireless module BT needs energy for the communication, which—such as mentioned—is done directly on the two conductor bus 4, then the energy storer C is not charged, and cannot be charged, for measuring. As mentioned, the charge status of the energy storer C is monitored and a measuring is only enabled, when enough energy is available. For this reason, the wireless module BT always receives enough energy for wireless communication 3 directly from the two conductor bus 4. The measuring is delayed until the energy storer is full. A measuring is only begun thereafter.

In a first embodiment, the wireless module BT informs the sensor element M that it is beginning operation, or is operating. The sensor element M then adapts its operation, so that always sufficient energy is available for the wireless module BT.

In an additional embodiment, in order to assure that the wireless module BT always has energy precedence over the sensor element M, the energy storer C is isolated from the two conductor bus 4. This can be done, for example, by a switch S. The switch S is, for instance, an FET, for example, a MOSFET. The wireless module BT can operate the switch S, in order that the energy storer C is isolated from the bus 4 always at the right time, for instance, in the case of transmission. The switching, e.g. a switching signal, is shown dashed. This coordination can also be accomplished using an intelligent unit, for instance, a microprocessor.

As already mentioned above, instead of a wireless module BT as function module, which can be supplied continuously by the bus 4, also a sensor element with small energy requirement can be selected, for instance, a temperature sensor or a pressure sensor. Likewise, instead of a sensor element M as function module with an energy requirement, which cannot be covered continuously by the bus 4, a wireless module with high energy requirement can be selected, for instance, a WLAN module. The explanations in the above paragraphs then hold analogously.

The invention thus proposes a solution, which permits a function module in the field device FD to claim the entire energy in a certain phase. This can occur by mutual signaling or advantageously such as above described by deactivating an energy storer C of the other function module. Typically, that function module has precedence, which does not have its own energy storer. The other module is permitted durably to use only as much power as can supplementally exactly still be made available by the two conductor bus.

This has the advantage that function modules, which require no energy buffering (e.g. a wireless module BT), can be operated in parallel with a function, which depends on an energy storer C (e.g. fill level measurement using the radar principle). There results, thus, an effective energy synchronization between different function modules in two wire devices. Function modules without energy storer have precedence in such case.

The invention claimed is:

1. A method for energy management of a process automation field device having a first module and at least a second module,
   wherein the field device is supplied with energy by a two conductor bus,
   wherein the first module, at least temporarily, consumes more energy than the two conductor bus continuously supplies, and an energy storer supplied with energy by the two conductor bus is associated with the first module,
   wherein the second module is supplied continuously with energy by the two conductor bus, the method comprising:
   controlling an operation of the first module and the second module such that the second module has energy precedence over the first module and the first module is at least temporarily not functional; and
   the second module isolating the energy storer from the two conductor bus during the operation of the second module.

2. The method as claimed in claim 1,
   wherein the second module has no energy storer and is continuously supplied with energy by the two conductor bus.

3. The method as claimed in claim 1, further comprising:
   the second module informing the first module of the second module's operation and the first module adapting the first module's operation such that an entire required energy of the field device can be provided by the two conductor bus.

4. The method as claimed in claim 1,
   wherein the first module includes a sensor element configured to register a measured variable and to forward values to a wireless module,
   wherein the second module includes the wireless module, and
   wherein the wireless module is embodied to wirelessly transmit the values to a superordinated unit.

5. The method as claimed in claim 4,
   wherein in the case of a maximum transmission power of the wireless module, the entire required energy of the field device can be provided by the two conductor bus.

6. The method as claimed in claim 4,
   wherein the sensor element is an ISFET or is a sensor element configured to measure a fill level according to the radar-principle, a pH-value, a redox potential, a conductivity, a turbidity or an oxygen content.

\* \* \* \* \*